United States Patent [19]
Sprecher

[11] 3,869,098
[45] Mar. 4, 1975

[54] VEHICLE OCCUPANT RESTRAINT BELT RETRACTOR

[75] Inventor: Raymond G. Sprecher, Detroit, Mich.

[73] Assignee: General Motors Corporation, Detroit, Mich.

[22] Filed: Aug. 23, 1973

[21] Appl. No.: 390,781

[52] U.S. Cl. .................................. 242/107.4
[51] Int. Cl. ..................... A62b 35/02, B65h 63/04
[58] Field of Search ........ 242/107.6, 107.7, 107 SB, 242/107.4; 280/150 SB

[56] References Cited
UNITED STATES PATENTS

| | | | |
|---|---|---|---|
| 3,552,676 | 1/1971 | Weber | 242/107.4 |
| 3,632,058 | 1/1972 | Stoffel | 242/107.4 |
| 3,682,412 | 8/1972 | Kuszynski | 242/107.4 |
| 3,700,184 | 10/1972 | Francis | 242/107.4 |
| 3,741,495 | 6/1973 | Takada | 242/107.4 |
| 3,794,266 | 2/1974 | Schwartz | 242/107.4 |

*Primary Examiner*—Billy S. Taylor
*Attorney, Agent, or Firm*—J. A. Kushman

[57] ABSTRACT

A winding prevention mechanism for a vehicle occupant restraint belt retractor of the inertia locking type that selectively holds the associated restraint belt unwound for use against the winding bias of the retractor belt reel. The mechanism is actuated to hold the belt unwound when the belt is unwound slightly further than the length required to snugly belt an occupant, allowed to wind back to a snug condition, and then unwound a slight amount less than a limited extent. If the belt is unwound more than the limited extent, the mechanism permits belt winding reel rotation that stores the belt within the retractor. A leaf spring type pawl is mounted on the retractor housing and normally biased into engagement with a ratchet wheel carried by the retractor belt reel so as to provide the actuated mechanism condition holding the belt unwound. A blocking disk is frictionally clutched to the belt reel so as to move between a blocking position preventing this engagement and a non-blocking position where the engagement is allowed. A control disk also frictionally clutched to the belt reel has a control portion that moves the pawl out of engagement with the ratchet wheel so as to allow the blocking disk to move to the blocking position in a manner that provides the sequenced operation of the retractor.

2 Claims, 6 Drawing Figures

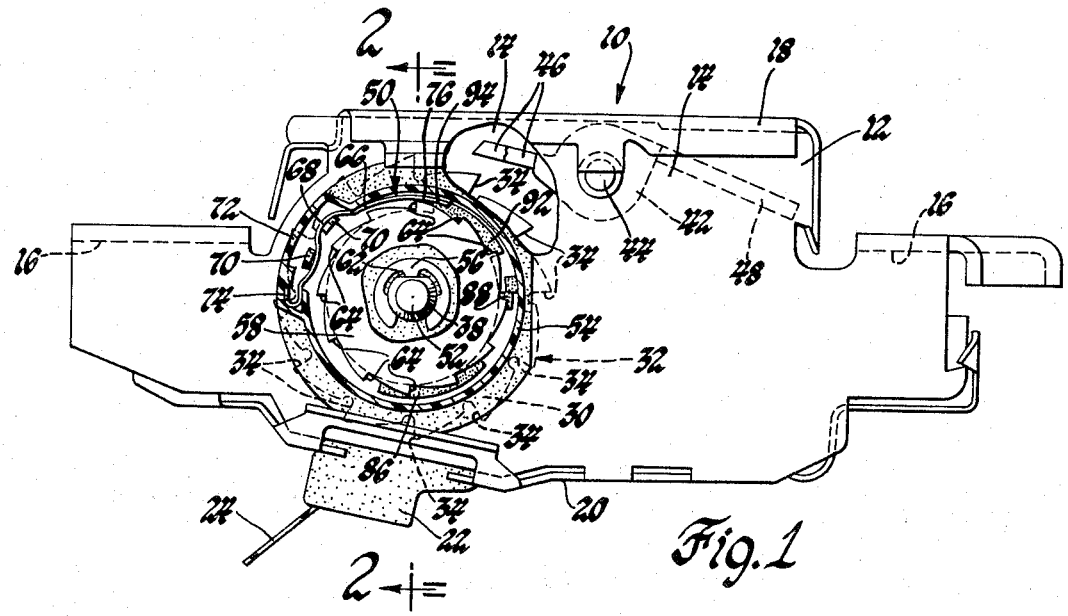
Fig.1
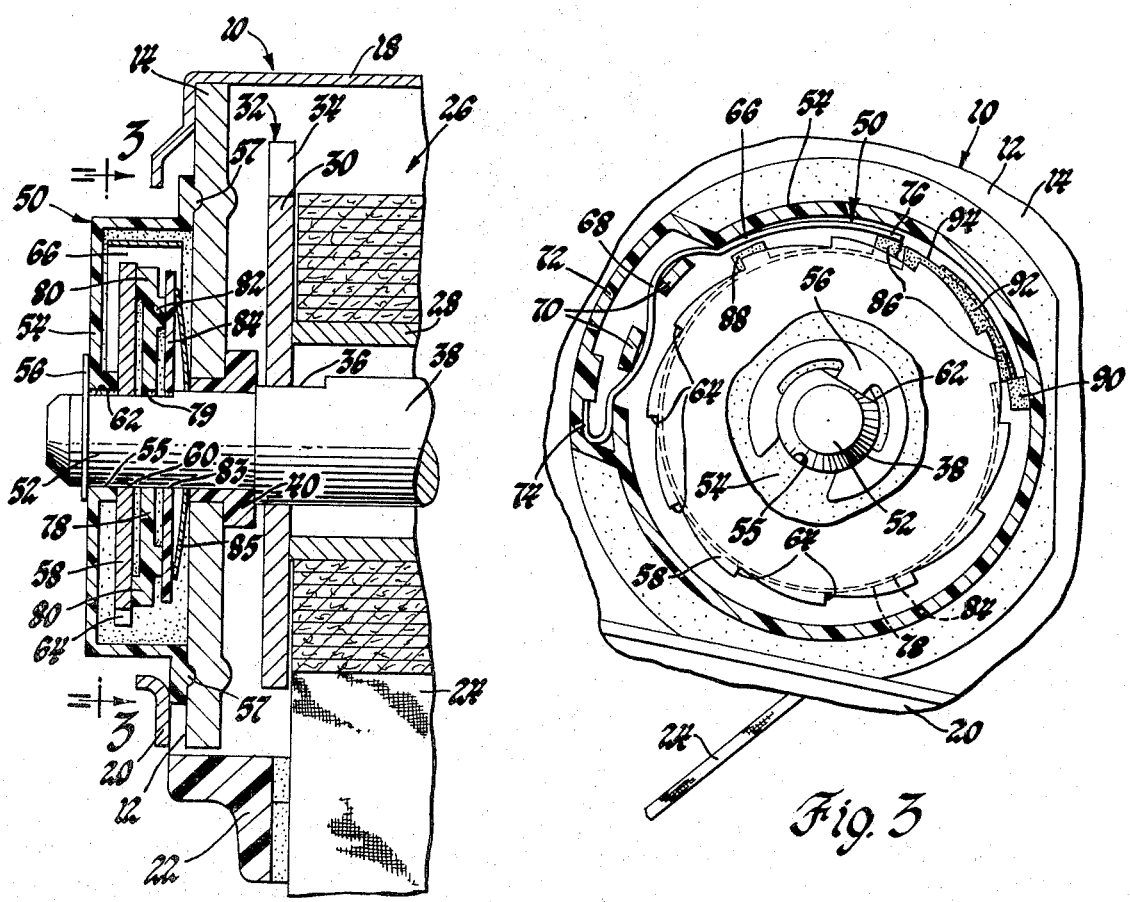
Fig.2
Fig.3

VEHICLE OCCUPANT RESTRAINT BELT RETRACTOR

BACKGROUND OF THE INVENTION

This invention relates generally to winding prevention mechanisms for vehicle occupant restraint belt retractors of the inertia locking type.

Vehicle occupant restraint belt retractors have heretofore been provided with winding prevention mechanisms that selectively hold the associated restraint belts unwound for use. This action relieves the restraint belt of the normal winding bias of the associated retractor belt reel so as to allow the belt to be in a non-tensioned condition while unwound for use.

For the most part in the past, this type of retractor has included a manual release for allowing the normal winding bias of the belt reel to subsequently wind the belt on the reel in a stored condition, and this release thus requires a deliberate occupant effort independent of the manual effort expended in moving the belt. It has also been known to provide such a winding prevention mechanism that includes a planetary gearing arrangement whose ring gear is driven by the retractor belt reel and whose sun gear pivotally supports one or more pawls. When the belt is allowed to move in a winding direction very slowly, the force of gravity moves the pawl downwardly as it reaches the upper portion of its movement and then into engagement with a notch on a fixed plate of the retractor housing. This engagement holds the reel against winding rotation so that the belt is held unwound for use. When the belt is released to allow the reel to wind under the full power of its winding bias, the reel moves much more rapidly and the gearing arrangement further increases the centrifugal force that the pawl is subjected to so as to throw the pawl upwardly against the force of gravity and prevent its engagement with the notch on the fixed housing plate. This action thus allows the belt winding movement of the reel to proceed until the belt reaches its fully stored condition.

Inertia actuated locking of such belt retractors against belt unwinding movement is provided by one of two responses. The retractor may be responsive to abrupt changes in the rate of vehicle movement so as to lock the retractor belt reel against belt unwinding movement or it may be responsive to an abrupt reel rotation caused by a sudden jerk on the belt so as to lock the belt against unwinding belt reel rotation. Either response holds the belt against unwinding during a vehicle impact so that a belted occupant is thus restrained.

SUMMARY OF THE INVENTION

This invention provides a winding prevention mechanism for a vehicle occupant restraint belt retractor of the inertia locking type and is responsive to belt reel rotation so as to detect belt winding reel rotation and to then distinguish between subsequent belt unwinding reel rotations that are greater and less than a limited extent thereof, with the reel being selectively held against belt winding rotation when the mechanism detects the lesser subsequent unwinding reel rotation, and with the reel being allowed to wind under its winding bias when the mechanism detects the subsequent greater unwinding belt reel rotation.

One feature of the winding prevention mechanism is that a stop is moved to an actuated condition to hold the belt reel against the belt winding rotation when the mechanism senses the winding and subsequent lesser belt unwinding reel rotation and is moved to an unactuated condition to permit the belt winding reel rotation when the mechanism senses the subsequent greater unwinding belt reel rotation. Another feature of the winding prevention mechanism is that the stop takes the form of a pawl and ratchet arrangement that is moved to an engaged condition so as to extend between the belt reel and the retractor housing when the mechanism is sequenced to hold the reel against belt winding rotation and is moved to a disengaged condition when the reel is sequenced to permit this winding reel rotation. Another feature of the winding prevention mechanism is that the ratchet is mounted on the retractor belt reel and the pawl is mounted on the retractor housing so as to be normally biased into engagement with the ratchet, with a blocking member movable between a blocking position that blocks this engagement and a non-blocking position which allows such engagement, and with a control that is responsive to the belt reel rotation to move the blocking member between the blocking and non-blocking positions in a sequenced manner. Another feature of the winding prevention mechanism is that the pawl has a leaf spring type configuration, and a blocking disk and a control disk are frictionally clutched to the belt reel to respond to reel movement and sequence the pawl movement between its engaged and disengaged conditions with respect to the reel ratchet so as to selectively prevent or allow the winding belt reel rotation under the winding reel bias.

BRIEF DESCRIPTION OF THE DRAWINGS

The above-specified features and other features, objects and advantages of the present winding prevention mechanism for a vehicle occupant restraint belt retractor of the inertia locking type are readily apparent from the following detailed description of the preferred embodiment and the drawings in which:

FIG. 1 is a partially broken away side elevation view of a vehicle occupant restraint belt retractor including a winding prevention mechanism, according to this invention, shown in a position corresponding with the belt being fully wound on the retractor belt reel;

FIG. 2 is an enlarged sectional view of a portion of the retractor taken along line 2—2 of FIG. 1 and shows the winding prevention mechanism at the outer end of the retractor belt reel shaft;

FIG. 3 is a sectional view of the winding prevention mechanism taken along line 3—3 of FIG. 2 and in a position corresponding with the belt unwound from its FIG. 1 position for use by a vehicle occupant;

DETAILED DESCRIPTION OF THE PREFERRED EMBODIMENT

Figure 4:
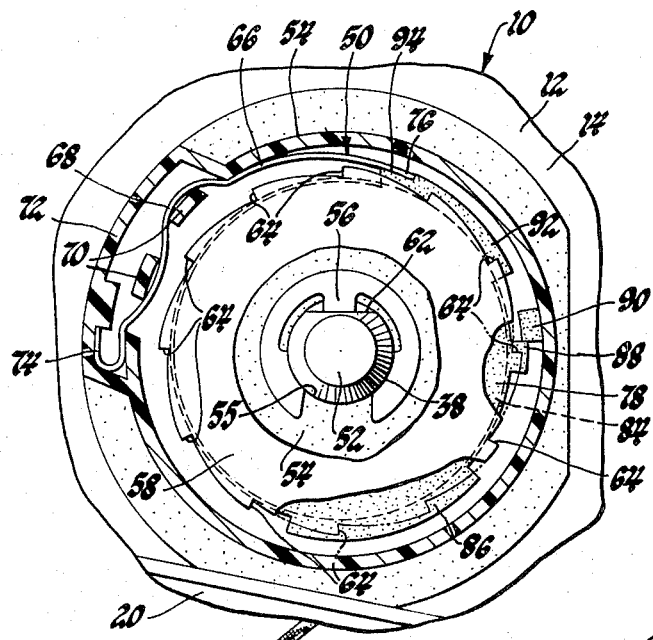
FIG. 4 is a view similar to FIG. 3 which shows the winding prevention mechanism in a position corresponding with the belt wound slightly towards the FIG. 1 position from the FIG. 3 position.

Referring to FIG. 1 of the drawings, a vehicle occupant restraint belt retractor is generally indicated by 10 and includes a metallic housing 12 consisting of a pair of spaced and parallel side walls 14. The ends of each of these side walls are connected to the other by horizontal mounting flanges 16 which include suitable apertures, not shown, for receiving mounting bolts that attach the retractor to a vehicle. This retractor is particularly adapted to be attached to the outer roof edge of the vehicle so as to function as a shoulder belt retractor. The upper side of the retractor is closed by a suitable cover 18 and the lower side thereof is likewise closed by a suitable cover 20. A belt guide 22 is suitably supported by the lower cover 20 and guides a restraint belt 24 that extends downwardly out of the retractor.

As can be seen by additionally referring to FIG. 2, the belt 24 is wound on a belt reel 26 located above the belt guide 22 between the housing side walls 14. This belt reel includes a drum 28 whose opposite ends, only one of which is shown, are fixedly secured to associated end plates 30 of the reel in a suitable manner. Each end plate defines an annular ratchet configuration 32 with locking surfaces 34 facing in the belt unwinding direction of rotation or clockwise as viewed in FIG. 1. The central portion of each end plate is apertured to receive an associated flatted portion 36 of a common belt reel shaft 38. This shaft is rotatably supported at each of its ends by a suitable annular plastic bearing 40 so as to be movable in belt winding and unwinding directions of rotation. The end of the shaft which is not shown in FIG. 2 and which is located away from the viewer in FIG. 1 is suitably slotted to receive the inner end of a clock spring that is also not shown. The outer end of this spring is secured to the adjacent housing side wall 14 so as to thereby bias the belt reel 26 in a belt winding direction.

A locking member 42 of retractor 10 is shown partially in hidden and partially in solid line representation in FIG. 1 and is pivotally mounted between the housing side walls 14 by a pin 44 so as to move between the unlocked position shown and a locked position located counterclockwise of the unlocked position. A pair of locking portions 46 of locking member 42 move downwardly toward the end plates 30 of the belt reel 26 during movement of the locking member to locked position and are thus engaged with a selected pair of the locking surfaces 34 on these reel end plates so as to selectively hold the belt reel against unwinding belt reel rotation in the FIG. 1 clockwise direction. A handle portion 48 of the locking member is acted upon by a suitable inertia member such as a pendulum to provide this locking movement of the locking member when the vehicle carrying retractor 10 is subjected to abrupt changes in the rate of vehicle movement. A locking mechanism of this type is shown in the application of Dully et al., Ser. No. 348,963, filed on Apr. 9, 1973 as a continuation-in-part of Ser. No. 328,877 which was filed on Feb. 1, 1973 and is now abandoned, both of these applications being assigned to the assignee of the present invention and being hereby incorporated by reference. It is also possible for the retractor of this invention to utilize an inertia locking mechanism responsive to belt reel rotation so as to provide reel locking against belt unwinding rotation upon an abrupt jerk of belt 24 from retractor 10. This latter type of locking mechanism is well known and is, therefore, not being described in detail.

As seen in FIGS. 1 and 2, retractor 10 includes a winding prevention mechanism indicated generally by 50. A reduced diameter end portion 52 of shaft 38 extends outwardly of the adjacent housing side wall 14, as seen in FIG. 2, and supports winding prevention mechanism 50 outside of the retractor housing. This mechanism is enclosed by a shallow cup-shaped plastic cover 54 that has a central aperture 55 receiving the extreme end of shaft end portion 52. A snap ring 56 is secured to this shaft end portion 52 so as to engage the outer side of the cover and position integral nubs 57 of the cover within complementary depressions in the housing side wall 14. This prevents the cover from rotating about the elongated axis of shaft 38.

Figure 5:
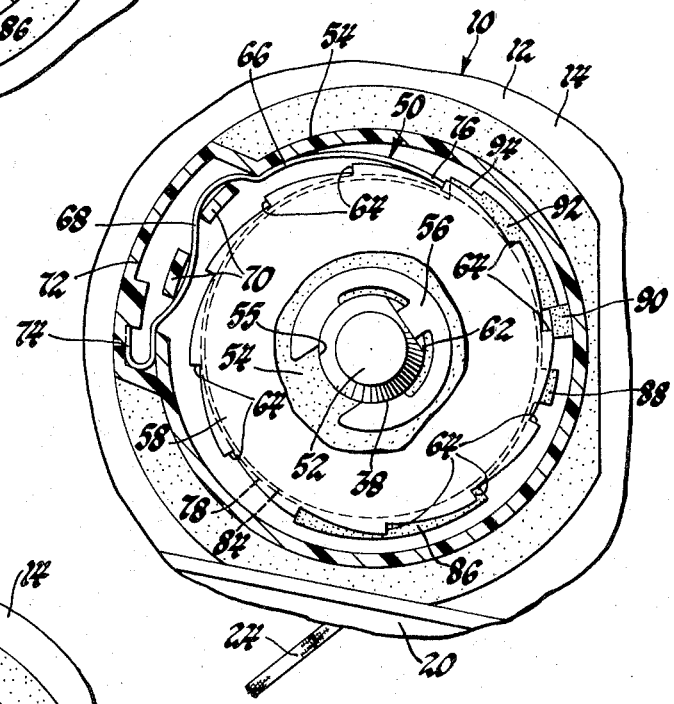
FIG. 5 is a view which shows the belt unwound to a slight degree from the position of FIG. 4 so as to allow engagement of the pawl of the mechanism with the ratchet wheel thereof so as to hold the belt unwound for use.

A metallic ratchet wheel 58 of winding prevention mechanism 50 includes a central aperture 60 which is generally circular but has a flattened side so that the aperture receives the shaft end portion 52 and engages a flat 62 on this shaft end portion. The ratchet wheel 58 is thus fixed with respect to the belt reel so as to rotate therewith during winding and unwinding belt reel rotation. Additional reference to FIG. 3 shows that the ratchet wheel 58 defines an annular ratchet configuration at its periphery with circumferentially spaced surfaces 64 that face in the belt winding direction of reel rotation, counterclockwise as viewed in FIGS. 1 and 3. A detent member of the mechanism takes the form of a leaf spring type pawl 66. One end portion of the pawl is indicated at 68 and has a slightly S-shaped configuration that winds around posts 70 of the mechanism cover 54 within an outer projection 72 of the cover. The conterclockwise end of spring portion 68 has a U-shaped configuration 74 and is nestled within the counterclockwise end of the outer projection 72 on the cover so as to secure the pawl in a fixed position with respect to the retractor housing. The free end 76 of the pawl is normally biased radially inward with respect to the ratchet wheel 58 and is selectively allowed to engage the outer periphery of this wheel, as shown by FIG. 5 in a manner that will be hereinafter described, so as to engage one of the surfaces 64 on the outer ratchet configuration of the wheel when the belt reel 26 moves in a belt winding direction under the winding reel bias. This engagement thus holds the belt unwound for use against the winding bias of the reel and allows a vehicle occupant to be belted in a slackened manner without applying any belt tension across the occupant.

A plastic control disk 78 of winding prevention mechanism 50 is located to the right of the ratchet wheel 58 when viewed as in FIG. 2 and has a central aperture 79 of a circular configuration receiving the shaft end portion 52 so that this control disk is rotatable with respect to the belt reel 26 about the elongated axis of reel shaft 38. The control disk 78 also has an outer annular portion 80 on its left-hand side which frictionally engages the ratchet wheel 58, and a somewhat smaller diameter annular portion 82 on its right-hand side. A plastic blocking disk 84 of mechanism 50 is located to the right of control disk 78 when viewed as in FIG. 2 and has a central aperture 83 of a circular configuration that also receives the shaft end portion 52 so that the blocking disk is rotatable with respect to the belt reel about the elongated axis of the reel shaft. A metallic washer type spring 85 likewise encircles the reel shaft end portion 52 and biases the control disk 78 and blocking disk 84 to the left in a manner that frictionally clutches these disks to the belt reel but allows either disk to be held against rotation when the reel is rotated. The plastic-to-plastic interface between the disks has a low coefficient of friction so that either disk will be rotated by reel rotation while the other remains stationary, the friction between disk 78 and metallic ratchet wheel 58 and between disk 84 and metallic washer spring 85 being greater than the plastic-to-plastic friction between the disks.

As best seen in FIG. 4, the control disk 78 includes an outer control portion 86 with an arcuate configuration positioned radially outward of the surfaces 64 on ratchet wheel 58. This control disk also includes radially outward extending positioning portion 88 that engages the lower side of an embossment 90 on the plastic cover 54 as shown in FIGS. 1 and 4 to limit counterclockwise rotation of this disk when the belt reel rotates in the counterclockwise belt winding direction. The blocking disk 84 includes a blocking portion 92 which is also located radially outward of the surfaces 64 on the ratchet wheel 58 and has a notch 94 at its counterclockwise end. As will be subsequently described, the blocking disk 84 is rotated between a counterclockwise blocking position and a clockwise nonblocking position in response to rotation of belt reel 26. In the blocking position, shown by FIG. 4, the notch 94 in the end of blocking portion 92 on the blocking disk receives the free end of pawl 66 and holds the pawl out of engagement with the ratchet wheel 58 so as to allow belt winding reel rotation under the winding bias of belt reel 26. In the non-blocking position shown in FIG. 5, the free pawl end 76 is allowed to engage the ratchet wheel 58 at one of the surfaces 64 to thereby provide a stop that holds the reel against belt winding rotation. This engagement thus allows the belt 24 to be held unwound for use in a slackened condition.

The operation of this winding prevention mechanism can be best understood from reference to FIG. 1 which shows the retractor 10 with the belt in a fully wound or stored condition. In this condition, the control disk 78 of the winding prevention mechanism is positioned so its positioning portion 88 engages the cover embossment 90 and locates the control portion 86 of this disk counterclockwise of the spring pawl 66, and the blocking disk 84 is in the blocking position holding the pawl 66 out of engagement with ratchet wheel 58. A vehicle occupant desiring to use belt 24 pulls the belt outwardly from the retractor and thereby rotates belt reel 26 clockwise. This reel rotation through its frictional clutching to the disks also rotates control disk 78 and blocking disk 84 clockwise. The blocking disk 84 is, however, rotated only a slight degree until the notch 94 in its blocking portion 92 disengages the spring pawl 66 and its clockwise end engages the upper side of the housing embossment 90 as shown in FIG. 3. The control disk is then counterclockwise of its FIG. 3 position and the spring pawl 66 thus ratchets over ratchet wheel 58 until further subsequent clockwise rotation of the control disk 78 causes its control portion 86 to engage the spring pawl 66 and move the free end 76 of the pawl radially outward with respect to the axis of rotation. The clockwise end of the control portion then engages the upper side of the cover embossment 90 and halts rotation of the control disk. Both the blocking disk and control disk will thus remain in their FIG. 3 positions as further belt unwinding reel rotation proceeds.

Attachment of the free end of belt 24 so as to hold the belt unwound for use, generally by a buckling operation, requires that the belt be unwound to a greater extent than that necessary to snugly belt the occupant in seated position. Thus, as the occupant releases the belt after its attachment, the belt reel rotates in the belt winding counterclockwise direction and begins to rotate the control disk 78 and blocking disk 84 counterclockwise from their FIG. 3 position. The free end 76 of the spring pawl 66 engages the notch 94 in the blocking portion 92 on the blocking disk 84 as this rotation proceeds to a slight degree and, thereafter, holds the pawl out of engagement with ratchet wheel 58 as the winding proceeds and control disk 78 is driven counterclockwise to its FIG. 4 position where its positioning portion 88 engages the cover embossment 90. The components of the winding prevention mechanism 50 are then in the same positions as in FIG. 1, when the belt was fully wound, and remain in these positions as any additional belt winding reel movement proceeds in order to provide a snug belt condition.

Figure 6:
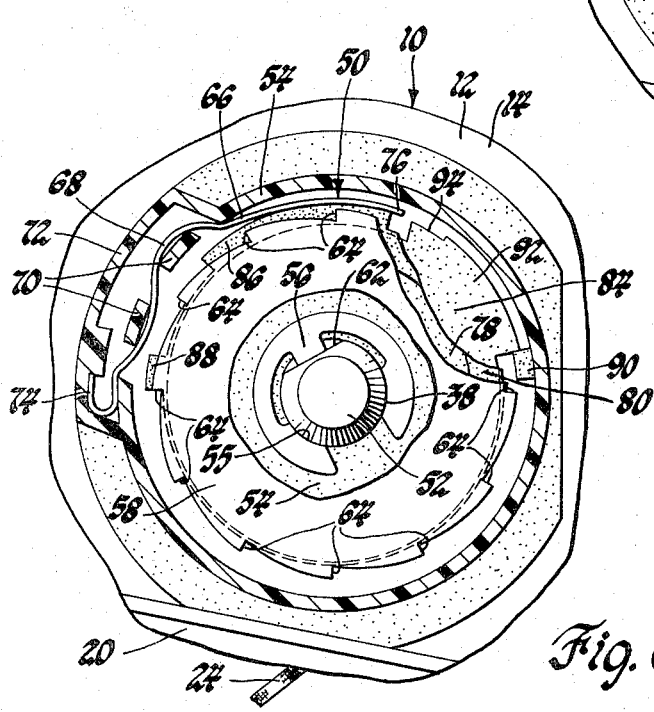
FIG. 6 is a view which shows the manner in which the pawl is moved out of engagement with the ratchet wheel upon a slightly further belt unwinding movement than that shown in FIG. 5 so as to allow winding reel rotation in a manner which again allows the belt to be fully stored on the retractor belt reel as in FIG. 1.

In order to actuate the winding prevention mechanism 50 and thereby hold the belt 24 unwound against the winding belt reel bias, an occupant then unwinds the belt to a limited extent and thereby moves the blocking disk 84 clockwise to its FIG. 5 position so that pawl 66 is engageable with the ratchet wheel 58 as shown in FIG. 5. This engagement allows the free pawl end 76 to contact one of the ratchet surfaces 64 and thereby hold the belt reel against winding rotation under the winding belt reel bias. The mechanism 50 thus holds the belt 24 in a slackened condition for use so that a vehicle occupant is not subjected to belt tension due to the winding bias of the belt reel. The degree of belt slackness may be increased by pulling the belt out of the retractor and engaging the pawl 66 with another surface 64 on the ratchet wheel 58. However, if this belt pull out is greater than a limited extent, the reel rotation moves control disk 78 to its FIG. 6 position so that the control portion 86 of this disk moves pawl 66 radially outward. Thereafter, belt winding movement of belt reel 26 will engage the free pawl end 76 with the notch 94 in the blocking portion 92 of the blocking disk 84 as the blocking disk rotates to its FIG. 4 position. The mechanism is then deactuated and permits belt winding reel rotation back to a snug belt condition or, if the occupant desires and has detached the free end of the belt, back to its fully wound condition. If the belt is wound only to the snug condition, subsequent belt unwindings less than the limited extent described above will again actuate mechanism 50 to prevent winding belt reel rotation.

It should be noted that the degree of belt winding reel rotation subsequent to the belt attachment and while moving to the snug belt condition, or the stage of operation between FIGS. 3 and 4 as described above, must be of a predetermined amount or the amount of subsequent belt unwinding to cause deactuation of winding prevention mechanism 50 will be lessened. More specifically, the control disk 78 must be rotated far enough counterclockwise so that its positioning portion 88 engages the cover embossment 90. If this does not occur, the control portion 86 of this disk will move back into engagement with pawl 66 upon a lesser subsequent belt unwinding than described above and will then deactuate mechanism 50 to permit belt winding with less of a belt pull out. However, the amount of belt slack normally present upon belt attachment before winding to the snug belt condition will provide a sufficient amount of rotation of the control disk to cause the engagement mentioned above, and even if it does not, the winding prevention mechanism 50 will still operate with the only difference being that the smaller belt pull out will deactuate the mechanism and permit belt winding. Also, the amount of belt pull out necessary to deactuate the mechanism may be varied by changing the circumferential position of the cover embossment 90 and/or the positioning portion 88 on the control disk with respect to the axis of rotation.

The above-described operation thus allows a vehicle occupant utilizing a retractor of this type as a shoulder belt retractor to move the belt outwardly for attachment in the use position and in a natural movement extend the belt slightly past this position for attachment, to subsequently allow belt winding to a snug condition about the occupant, and to then merely shrug his shoulder so that the consequent limited belt unwinding movement then causes the mechanism to be actuated and to thereby hold the belt against winding. If this shoulder shrug is accentuated so as to deactuate the mechanism and allow belt winding, the mechanism again permits belt winding to a snug condition and the occupant may again shrug his shoulder in a more limited manner to actuate the mechanism against belt winding. Thus, if an occupant leans forward to manipulate a vehicle forward component and then moves back, a mere shrug of the shoulder then actuates the belt winding prevention mechanism. This action thus is very natural and provides an effective device. Storage of the belt after detachment is accomplished by allowing a full belt winding after this deactuation of the mechanism by the greater belt unwinding movement.

It is believed evident from the foregoing description that this invention provides a new and improved winding prevention mechanism for a vehicle occupant restraint belt retractor of the inertia locking type.

What is claimed is:

1. In a vehicle occupant restraint belt retractor including a housing adapted to be mounted on a vehicle, a belt reel rotatably supported by the housing, an occupant restraint belt wound and unwound from the reel upon reel rotation in opposite directions, means normally biasing the reel in the belt winding direction of rotation, and an inertia locking mechanism for selectively locking the belt reel against rotation in the belt unwinding direction, a mechanism for selectively preventing the biasing means from rotating the belt reel in the belt winding direction so as to hold the belt in an unwound condition for use, the mechanism comprising:

a circular ratchet configuration on the belt reel concentric about the axis of rotation thereof and having locking surfaces spaced circumferentially thereabout so as to face in the belt winding direction of reel rotation;

a detent member mounted on the housing for movement between a nonlocking position out of engagement with the circular ratchet configuration so as to permit belt winding reel rotation and a locking position in engagement with the ratchet configuration so as to prevent this belt winding reel rotation; means biasing the detent member to the locking position;

the belt reel having an annular surface generated about the axis of reel rotation and rotatable therewith during belt winding and unwinding reel rotation;

a control disk rotatable with respect to the reel about the rotational axis thereof and having one side engaged with the annular surface of the reel, the control disk including a control portion that engages the detent member to move this member to the nonlocking position when the control disk rotates in the belt unwinding direction so that the reel is thereby free to rotate in the belt winding direction, a first pair of engageable surfaces on the control disk and the housing for limiting the rotation of the control disk in the belt unwinding direction after the detent member has been moved to the nonlocking position, and a second pair of engageable surfaces on the control disk and the housing for limiting the rotation of the control disk in the belt winding direction of rotation so that the total rotation of the control disk is less than one revolution;

a blocking disk rotatable with respect to the reel about the rotational axis thereof and being positioned on the opposite side of the control disk from the annular surface of the reel, the blocking disk having a blocking portion with a notch for holding the detent member in the nonlocking position after the control disk moves the detent member to this non-locking position, the detent member engaging the blocking portion to limit movement of the blocking disk in the belt winding direction, and a pair of engageable surfaces on the housing and the blocking disk for limiting rotation of the blocking disk in the belt unwinding direction so that the total rotation of the blocking disk is less than one revolution; and a resilient spring means engaging the side of the blocking disk opposite the control disk so as to bias the blocking disk into frictional engagement with the control disk and to in turn bias the control disk into frictional engagement with the annular surface of the reel so that reel rotation rotates the control disk in a clutched manner between the limits of its rotation and rotation of the control disk rotates the blocking disk in a clutched manner between the limits of its rotation, the control disk being rotated by this clutching to its limit of rotation in the belt unwinding direction as the belt in unwound to thereby move the detent member to its nonlocking position, the notch in the blocking portion of the blocking disk engaging the detent member to hold the detent member in the nonlocking position so as to permit the reel to wind the belt and to concomitantly prevent the clutching of the blocking disk to the control disk from rotating the blocking disk in the belt winding direction with the control disk, the blocking disk being subsequently moved in the belt unwinding direction of rotation by the control disk as the belt is unwound so as to disengage the detent member and allow the bias thereof to move the detent member to locked position and to thereby prevent belt winding until the belt is subsequently unwound a sufficient extent to again engage the control portion of the control disk with the detent member so as to again move the detent member to the nonlocking position.

2. In a vehicle occupant restraint belt retractor including a housing adapted to be mounted on a vehicle, a belt reel rotatably supported by the housing, an occupant restraint belt wound and unwound from the reel upon reel rotation in opposite directions, means normally biasing the reel in the belt winding direction of rotation, and an inertia locking mechanism for selectively locking the belt reel against rotation in the belt unwinding direction, a mechanism for selectively preventing the biasing means from rotating the belt reel in the belt winding direction so as to hold the belt in an unwound condition for use, the mechanism comprising:

a ratchet wheel fixed to the belt reel for rotation therewith and defining an annular ratchet configuration at the periphery thereof with locking surfaces facing in the belt winding direction of rotation, the ratchet wheel having one side that faces axially with respect to the axis of reel rotation;

a leaf spring type pawl including one end mounted on the housing and a free end normally biased into engagement with the ratchet configuration of the ratchet wheel so as to engage one of the locking surfaces and thereby prevent belt winding reel rotation, the free end of the pawl being movable out of engagement with the ratchet wheel to permit belt winding rotation of the reel;

a control disk rotatable with respect to the reel about the rotational axis thereof and having one side thereof engaged with the axial facing side of the ratchet wheel, the control disk including a control portion that engages the free end of the pawl when the control disk rotates in the belt unwinding direction and thereby moves the pawl out of engagement with the ratchet wheel so that the reel may rotate in the belt winding direction, a first pair of engageable surfaces on the control disk and the housing for limiting the rotation of the control disk in the belt unwinding direction after the pawl has been moved out of engagement with the ratchet wheel, and a second pair of engageable surfaces on the pawl and the housing for limiting the rotation of the control disk in the belt winding direction so that the total rotation of the control disk is less than one revolution;

a blocking disk rotatable with respect to the reel about the rotational axis thereof and being positioned on the opposite side of the control disk from the ratchet wheel, the blocking disk having a blocking portion with a notch for engaging and thereby holding the pawl out of engagement with the ratchet wheel after the control portion of the control disk has moved the pawl from engagement therewith, the pawl engaging the blocking portion to limit rotation of the blocking disk in the belt winding direction of rotation, and a pair of engageable surfaces on the housing and the blocking disk for limiting rotation of the blocking disk in the belt unwinding direction so that the total rotation of the blocking disk is less than one revolution; and a spring engaging the side of the blocking disk opposite the control disk so as to bias the blocking disk into frictional engagement with the control disk and to in turn bias the control disk into frictional engagement with the ratchet wheel so that reel rotation rotates the control disk in a clutched manner between the limits of its rotation and rotation of the control disk rotates the blocking disk in a clutched manner between the limits of its rotation, the control disk being rotated by this clutching to its limit of rotation in the belt unwinding direction as the belt is unwound to thereby move the pawl out of engagement with the ratchet wheel, the notch in the blocking portion of the blocking disk subsequently engaging the pawl to hold the pawl out of engagement with the ratchet wheel so as to permit the reel to wind the belt and to concomitantly prevent the clutching of the blocking disk to the control disk from rotating the blocking disk in the belt winding direction with the control disk, the blocking disk being subsequently moved in the belt unwinding direction of rotation by the control disk as the belt is unwound so as to disengage the pawl and allow the bias thereof to move the free end of the pawl into engagement with the ratchet wheel to prevent belt winding until the belt is subsequently unwound a sufficient amount to again move the control portion of the control disk into engagement with the free end of the pawl and thereby disengage the pawl from the ratchet wheel.

* * * * *